United States Patent

[11] 3,603,820

[72] Inventor Claus H. Schuenemann
Schonaich, Germany
[21] Appl. No. 779,045
[22] Filed Nov. 26, 1968
[45] Patented Sept. 7, 1971
[73] Assignee International Business Machines Corporation
Armonk, N.Y.
[32] Priority Dec. 15, 1967
[33] Germany
[31] P 15 24 892.7

[54] BISTABLE DEVICE STORAGE CELL

3 Claims, 5 Drawing Figs.

[52] U.S. Cl. .......... 307/305,
317/235 E, 317/235 R, 317/235 AB, 307/238,
307/284, 307/291
[51] Int. Cl. .......... H01l 19/00
[50] Field of Search .......... 317/235;
307/238, 284, 291, 305, 313, 252

[56] References Cited

UNITED STATES PATENTS

| | | | |
|---|---|---|---|
| 2,949,549 | 8/1960 | Hoge | 307/291 |
| 3,423,737 | 1/1969 | Herper | 307/238 |
| 3,491,342 | 1/1970 | Lee | 307/238 |
| 3,505,573 | 4/1970 | Wiedmann | 317/235 |

OTHER REFERENCES

Electronics, " Helpful Transistor Analog: 4-layer PNPN-2 Transistors" by Stasior, pages 66– 70, August 10, 1964, 307-305

IBM Tech. Discl. Bul., " Data Storage with SCR Memory Cells" by Schunemann et al., Vol. 10, No. 12, pages 1991–1992, May, 1968, 307-284

*Primary Examiner*—Jerry D. Craig
*Attorneys*—Hanifin and Jancin and James E. Murray

ABSTRACT: This specification describes a semiconductor storage cell that employs two cross-coupled PNPN switching devices as its active elements. At any given time one switching device conducts while the other switching device is held off by the crosscoupling between the two devices. By using the mentioned switching devices in place of transistors, the amount of power dissipated by the storage cell is reduced considerably.

INVENTOR
CLAUS H. SCHUENEMANN
BY
ATTORNEY

BISTABLE DEVICE STORAGE CELL

BACKGROUND OF THE INVENTION

The present invention relates to semiconductor storage cells and more particularly to semiconductor storage cells employing cross-coupled semiconductor devices as the active elements of the cell.

One problem with the use of bistable cross-coupled transistor circuits as storage cells in monolithic memories for computers is that the heat that the cells dissipate while they are operating causes the temperature of the monolithic chips on which the storage cells are formed to rise. To keep the temperature of the chips within the proper operating range, it is therefore necessary that the chips be cooled. As the bit density, or the number of cells in a given area of a chip is increased, the heating problems become more critical and very sophisticated and expensive cooling apparatus must be used in order to maintain the chips at an operating temperature level. At even higher bit densities, it becomes impossible to cool the chips with conventional cooling systems. For these reasons dissipation of heat by the cells materially adds to the cost of monolithic memories and also is a limiting factor on the speed of operation of the memory and the size of the memory. Therefore, it is desirable to reduce the dissipation of heat by the cells.

One cause of the heat dissipated by the cells is the current that must run through the cross-coupled transistors of the cell to sustain the bistable state of the cells while the cells are not being addressed for reading or writing but are merely storing information. A method of reducing this sustaining current is to power the storage cells at two levels, that is, to supply one level of current to a storage cell while the storage cell is being addressed for reading and/or writing and to supply another lower level of sustaining current to the storage cell while the storage cell is merely storing information. While this "bilevel" powering of storage cells has gone a long way to reduce the sustaining current supplied to storage cells, its effectiveness is limited by the fact that with standard transistors the sustaining current cannot be reduced below a given level without causing the cell to lose its state.

SUMMARY

In accordance with the present invention the amount of sustaining current supplied to the cells is reduced further than heretofore possible by substituting a four zone switching device for each of the cross-coupled transistors. Preferably the switching devices are PNPN control rectifiers which have their intermediate N and P zones cross-connected. This cross-connection between the switching devices retains one of the switching devices off while the other is conducting and makes each switching device responsive to changes in the state of the other switching device. Thus the states of the switching devices are made responsive to control signals for reading and writing binary information in the cell and information is retained in the cell with a small sustaining current.

Therefore it is an object of the present invention to provide storage cells which can be fabricated into monolithic memories.

It is also an object of the present invention to provide a storage cell which dissipates very little power.

It is a further object of this invention to provide storage cells which operate at two different power levels.

The foregoing and other objects, features and advantages of the invention will be apparent from the more particular description of the preferred embodiment of the invention as illustrated in the accompanying drawings, of which:

Figure 1:
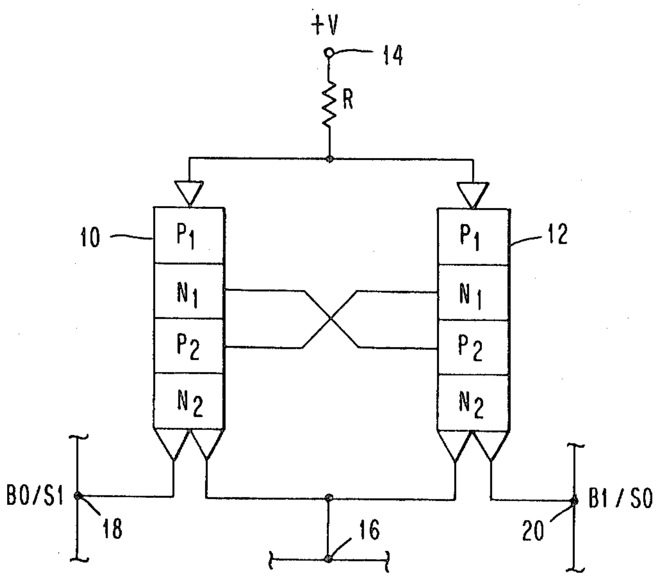
FIG. 1 is a schematic representation of a storage cell which incorporates the present invention.

In FIG. 1, two multiemitter PNPN switching devices 10 and 12 are shown cross-connected to form a bistable circuit. These switching devices belong to a family of semiconductor devices which exhibit characteristics akin to gas thyratrons and are generally referred to as silicon-controlled rectifiers though not all the devices in the family are made of silicon.

As illustrated, each of the devices 10 and 12 has a gating terminal which controls the flow of current between the anode and cathode terminals of the device. In accordance with the present invention, the gating terminal of each of the devices 10 and 12 are connected to an additional terminal at the intermediate N1 zone of the other device while the anodes of the devices 10 and 12 are connected together and through a resistor R to a positive terminal 14 of a bilevel source of potential. As shall be seen later, cross-connecting devices in this manner makes each of the devices responsive to changes in the state of the other and retains one of the devices off while the other device is conducting.

The devices 10 and 12 each have two cathodes or emitters. Two of these emitters, one emitter of each of the devices, are connected together and to a work line terminal 16 for the receipt of read and write pulses while the remaining emitter of each device is connected to a different bit line terminal 18 or 20 for receipt of write pulses and the transmission of read output signals.

Figure 2:
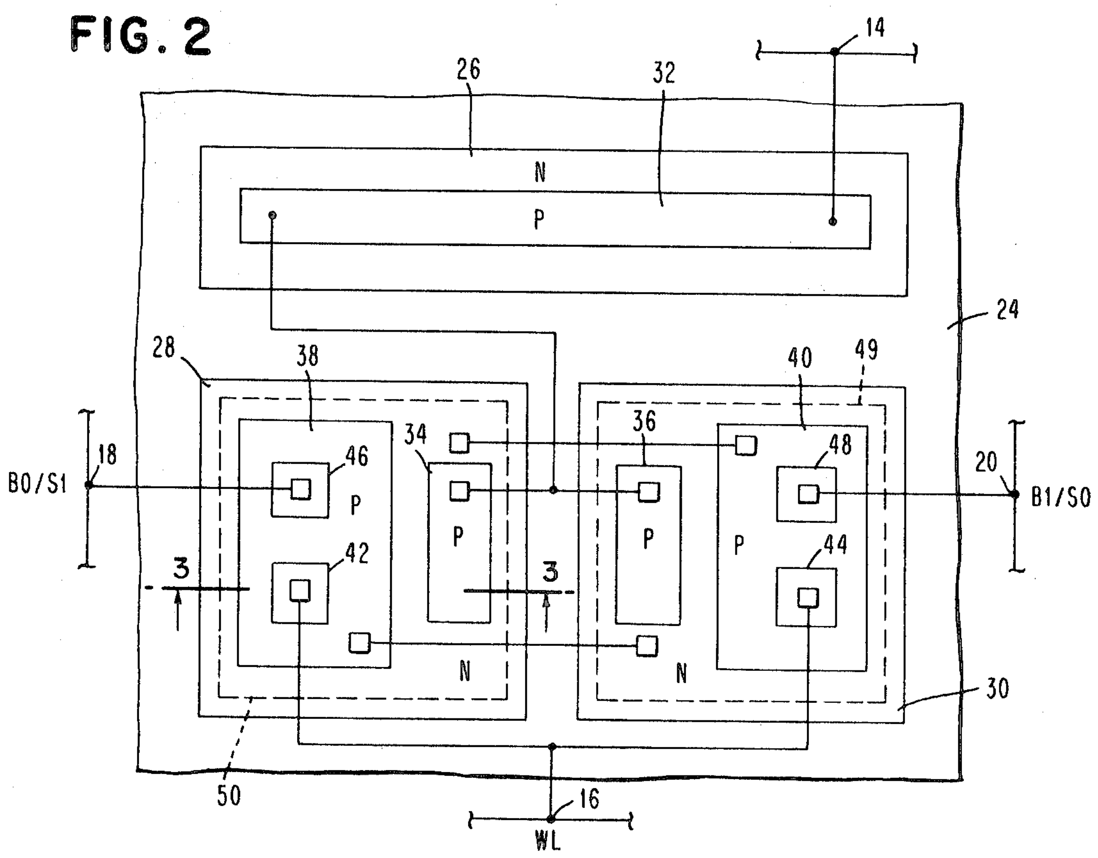
FIG. 2 is a pattern illustrating how the storage cell of FIG. 1 is fabricated in monolithic form.
Figures 3, 4:
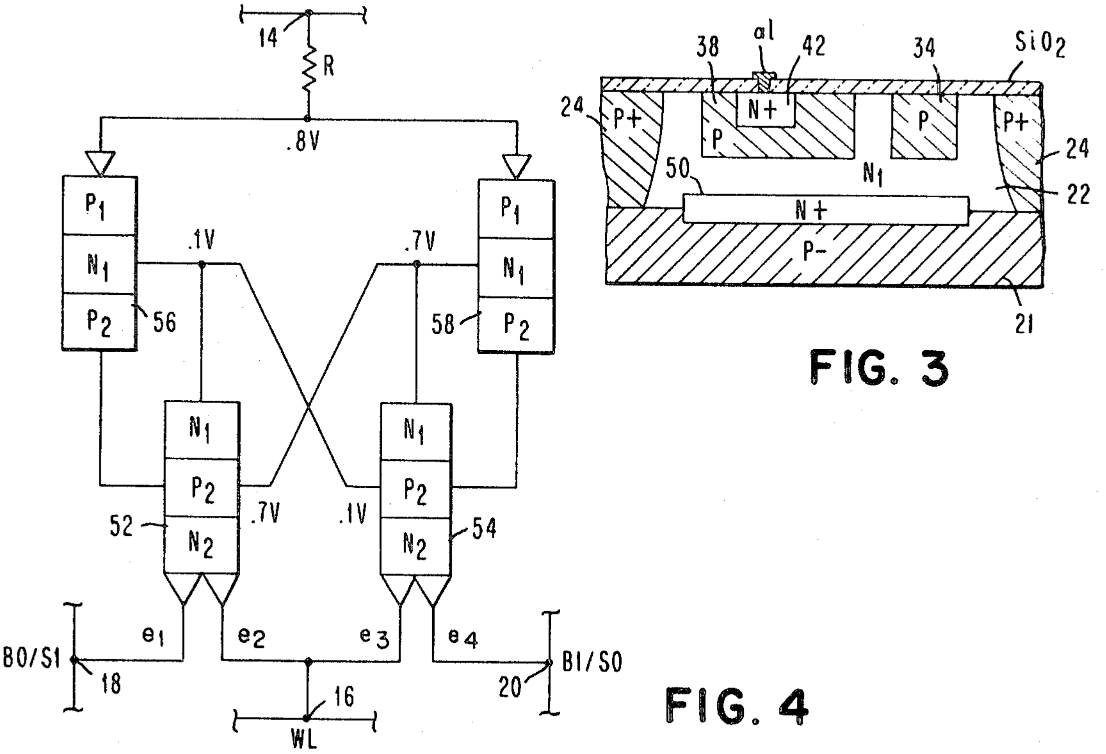
FIG. 3 is a section through FIG. 2 taken along line 3—3.
FIG. 4 is a schematic showing the transistor equivalent of FIG. 1.

To better understand how this circuit is structured in monolithic form reference should be made to FIGS. 2 and 3. These figures show a slice 21 of P— conductivity type silicon having formed thereon an epitaxial layer 22 of N conductivity type silicon. Diffused into the epitaxial layer 22 down to the P— slice 21 is a P+ pattern 24 that provides three isolated zones 26, 28 and 30 of the N conductivity epitaxial layer. In one of these zones 26 the resistor R is formed by a P diffusion 32 while the switching devices are formed by multiple diffusions in the other two zones 28 and 30. In each of these other two zones 28 and 30 there is both a small and a large P diffusion region. The small P diffusion regions 34 and 36 are each connected by appropriate metallization to one end of the elongated resistor diffusion 32, which is connected at its other end to the terminal 14. In each of the larger P regions 38 and 40 there are two N+ regions which are the emitters of the devices. Two of these N+ regions 42 and 44 are joined together and to the word line WL by a metallization connection while the other two emitters 48 and 46 are connected to bit lines B1/S0 and B0/S1 respectively. The storage cell is completed by adding the cross-coupling connections. This is accomplished by connecting the large P diffusion area in each of the zones 28 and 30 to the N epitaxial portion of the other zone with a metallization connection. Buried under each of the zones 28 and 30 is an N+ subcollector diffusion 49 or 50 which functions to cut down collector resistance.

The storage cell shown in FIGS. 2 and 3 can be schematically illustrated as composed of four layer switching devices as shown in FIG. 1. However, the operation of the storage cell can be best understood if discussed in terms of complementary transistors arranged in hook circuits as illustrated in FIG. 4. Corresponding zones in the cell have been similarly lettered in FIGS. 1 and 4 to show the relationship active in the devices shown in the two figures.

The relationship between the devices shown in FIGS. 2 and 3 and those in FIG. 4 is that multiemitter transistors 52 and 54 are the vertical transistors formed between the epitaxial layers of the N isolation zones 28 and 30 and the small N emitter diffusion regions 42 through 46 in the large P diffusion regions 38 and 40 while the PNP transistors 56 and 58 are horizontal transistors formed between the small 34 and 36 and large 38 and 40 P diffusion regions in each of the isolation areas 28 and 30.

Figure 5:
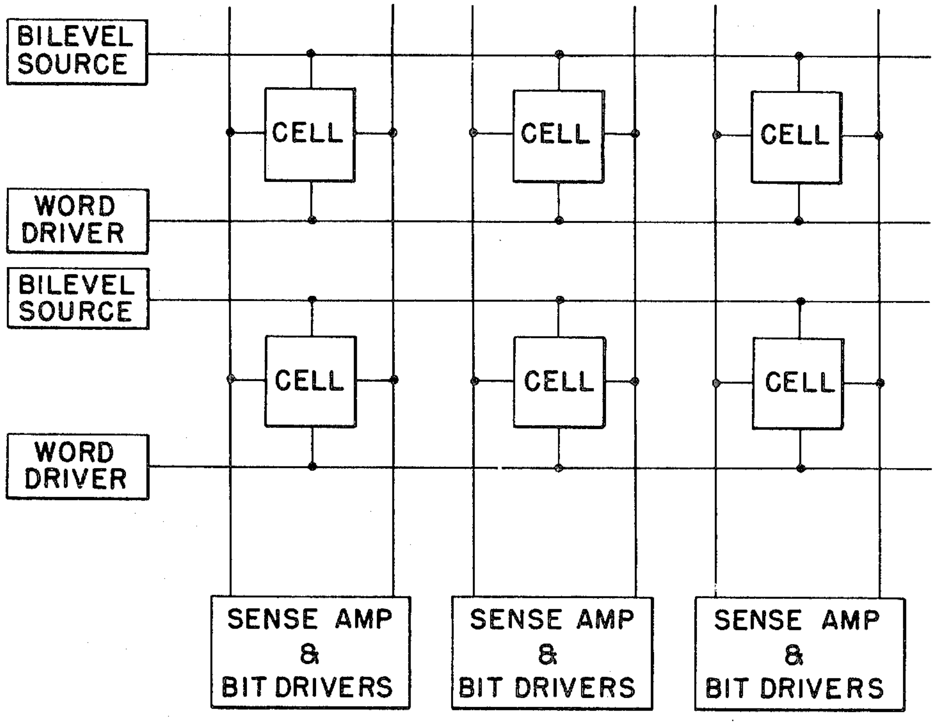
FIG. 5 is a schematic showing how the storage cell can be arranged in matrices and addressed for storing information.

Assume now that the storage cell is merely storing information and that it is storing a digital "1" as opposed to a digital "0."

through the emitter to collector path of transistor 56 and the base to emitter path of transistor 52 so that the collector current of transistor 56 is the base current of transistor 52. Likewise current flows from the positive terminal 14 of the source through the emitter to base path of transistor 56 and the collector to emitter path of transistor 52 so that the collector current of transistor 52 serves as the base current of transistor 56. The gains of transistors 52 and 56 are both greater than their unity so that the collector current of each transistor is greater than its base current. Therefore regenerative action takes place in which the transistors 52 and 56 drive each other harder and harder until both the transistors are driven into saturation. Once both the transistors 52 and 56 are in saturation a very small current called the sustaining current will maintain conduction through the transistors. For this reason the potential at terminal 14 is maintained at a low level by the bilevel source shown in FIG. 5, while the storage cell merely is storing information.

In the storage mode of operation for the cell the sustaining current flows through the resistor R and the transistors 58 and 54 to the word line terminal 16 which is maintained approximately at ground potential during this mode of operation. Typical voltages at various points of the storage cell while transistor 52 and 56 are conducting are illustrated in FIG. 4. These voltage bias the transistors 54 and 58 off since in the case of both transistors the voltage difference between the base to emitter junction of these transistors is not sufficient to forward bias the transistor into conduction. Thus while the storage cell is storing a "1" transistors 52 and 56 conduct and transistors 54 and 58 are biased off. In the same manner, when a "0" is stored in the cell, transistors 54 and 58 conduct and hold transistors 52 and 56 off.

So far in describing the operation of the cell it has been pointed out that the current through the transistors flows toward the word line terminal 16. This is because the emitters *e*2 and *e*3 connected to the word line terminal 16 are biased at a lower potential than the emitters *e*1 and *e*4 connected to the bit line terminals 18 and 20. To read information stored in the cell, the potential on the word line WL is raised above the potential on the bit lines B0/S1 and B1/S0 causing current flowing to the word line WL through either inner emitter *e*2 or *e*3 to switch and flow to the bit lines through one of the outer emitters *e*1 and *e*4. The current on the bit lines produced by raising the potential of the word line is differentially sensed by the sense amplifier illustrated in FIG. 5. If 52 and 56 are conducting and transistors 54 and 58 are biased nonconducting, current flows through emitter *e*1 to the B0/S1 sense line while there is no current through the emitter *e*4. Therefore there is a differential signal produced between the B0/S1 and the B1/S0 sense lines that is picked up by the sense amplifier and recognized by the sense amplifier as a stored "1." If transistors 54 and 58 are conducting while transistors 52 and 56 are off, the sense amplifier would recognize the differential signal produced when the word line voltage is raised as a stored "0." When reading is completed the word line potential is returned to its initial value so that current again shifts back and flows through the inboard emitter *e*2 or *e*3 so that it cannot be sensed on the bit lines. During the read operation, the potential at terminal 14 is raised by the bilevel source shown in FIG. 5. After read cycle is complete, it too is returned to its initial value.

During the read operation, the information stored in the cell is left undisturbed. Thus the storage cell provides a nondestructive readout mode of operation leaving the information in the storage cell where it can be read again. If you wish to change the information stored in the storage cell, the potential on one of the bit lines B0/S1 or B1/S0 must be raised when the potential on the word line WL is increased. For instance, assume that you wish to store a "0" in the cell when a "1" is presently stored in the cell. The potential on the word line WL and the B0/S1 bit line are raised until current no longer flows through either emitter *e*2 or *e*1. This turns transistors 52 and 56 off and allows transistors 54 and 58 to go into conduction. Transistors 54 and 58 then conduct current from the +V terminal to the outer emitter terminal *e*4 which had been maintained at its original lower voltage. After the switching of the states occurs the potential on the B0/S1 line and the word line WL are returned to their initial values so that current flows in the cell from the +V source through resistor R transistors 58 and 54 to the word line WL so that the state of the cell cannot be sensed on either bit line. If a binary "1" were to be written in the cell, the same procedure would be employed but instead of raising the potential on the B0/S1 sense line, the potential on the B1/S0 sense line is raised with the word line potential to assure that transistors 52 and 56 conduct.

While the invention has been particularly shown and described with reference to the preferred embodiment thereof, it will be understood by those skilled in the art that various changes in form and details may be made therein without departing from the spirit and scope of the invention.

What is claimed is:

1. A monolithic storage cell comprising:

a. first and second semiconductor zones of one conductivity type, each said zone having therein a base region of opposite conductivity type which is electrically connected to the other zone, so that the zones and base regions are electrically cross-coupled, each of said base regions having at least two emitter regions, wherein one emitter region in each of said base regions are connected together;

b. a second region of said opposite conductivity type in each zone, said second regions being electrically connected together and spaced from said base regions; and c. variable source means connected to said second regions of opposite conductivity and to those said connected emitter regions for varying the potentials applied to the storage cell to read, write and store information, said means including means for varying the potential at one emitter terminal and each of the other emitter terminals independently of one another.

2. In a matrix of bistable memory cells each addressed by the selection a plurality of lines out of a grid of addressing lines, storage cells each comprising:

a. two control rectifiers each having four zones of alternating conductivity and a plurality of cathodes;

b. means cross-connecting the intermediate zones of said control rectifiers for maintaining one of the control rectifiers nonconducting when the other control rectifier conducts;

c. a first word line means coupled to the anodes of both said control rectifiers for supplying two levels of potential to said anodes, one higher level of potential while the storage cell is being addressed for reading or writing and a lower level of potential while the storage cell is merely storing data;

d. a second word line means coupled to one of the cathodes of each of the control rectifiers for supplying two levels of potential to those two cathodes, a higher level of potential while data is being written or read in the storage cell and the lower level of potential while data is merely being stored in the storage cell; and e. separate bit line means connected to the other cathode of each control rectifier for supplying at least two levels of potential to that cathode independently of the potential supplied by the bit and word lines to the other three cathodes of the control rectifiers, one lower level of potential while the storage cell is being addressed for reading or is merely storing information and a higher level of potential when the particular control rectifier is to be turned off in the course of writing data into the storage cell.

3. The storage cell of claim 2 wherein control rectifiers are each PNPN devices.